June 6, 1961 W. L. WOOD 2,986,862
COTTON PICKING MACHINE
Filed March 31, 1958 2 Sheets-Sheet 1
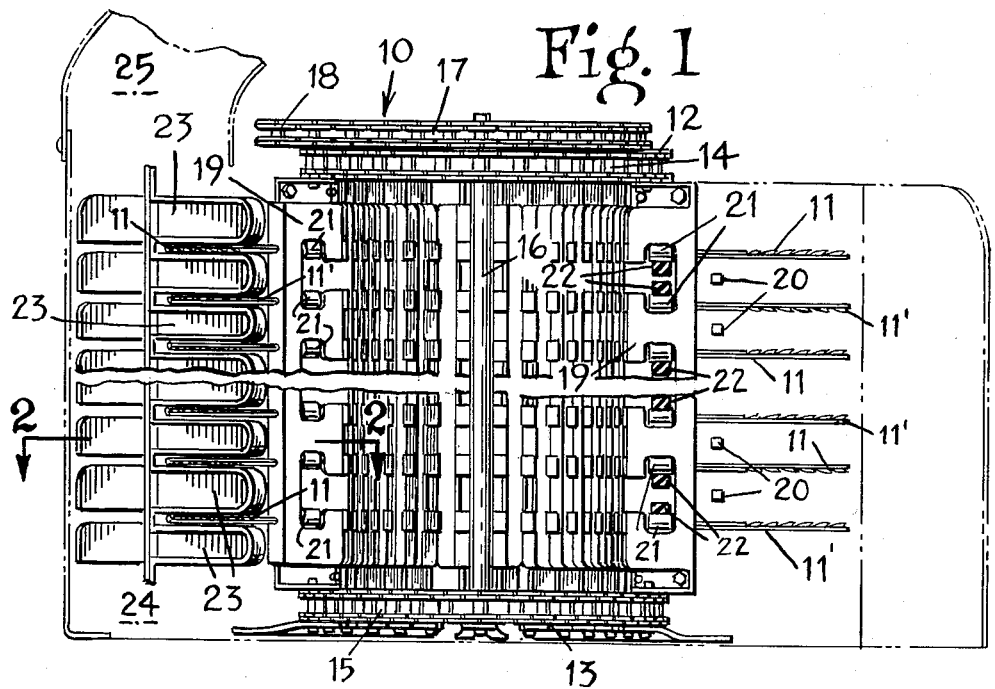
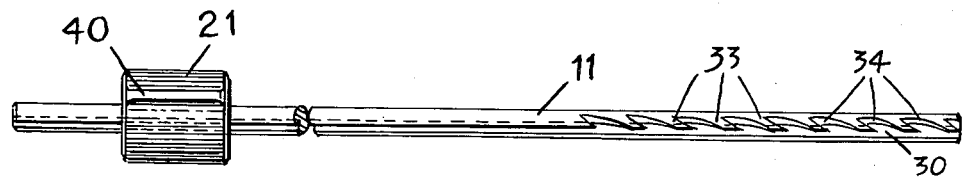
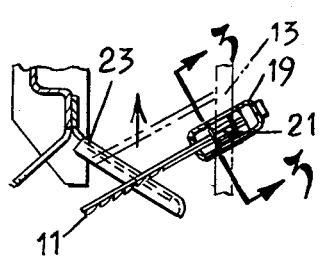
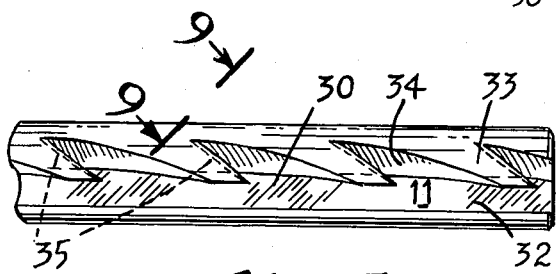
INVENTOR:
William L. Wood,
BY
Harrington A. Lackey
ATTORNEY.

June 6, 1961 W. L. WOOD 2,986,862
COTTON PICKING MACHINE
Filed March 31, 1958 2 Sheets-Sheet 2
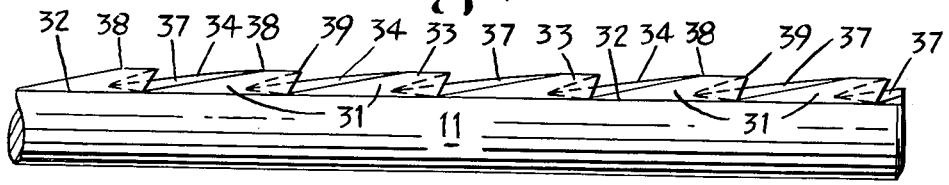
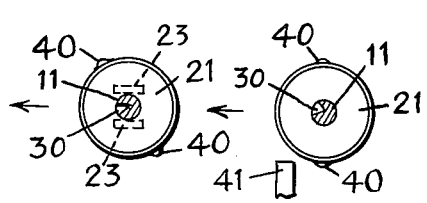
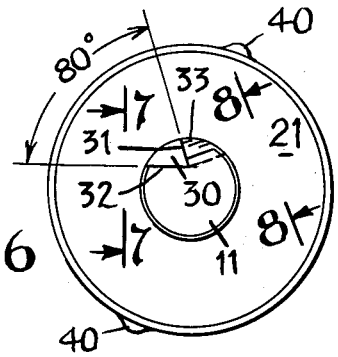
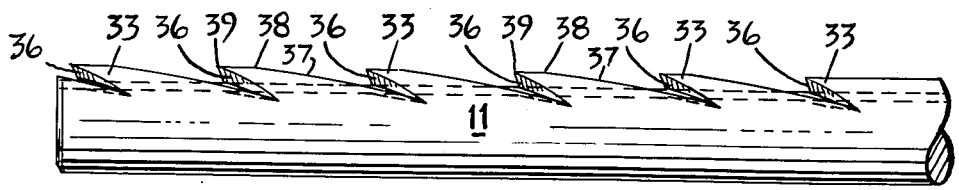
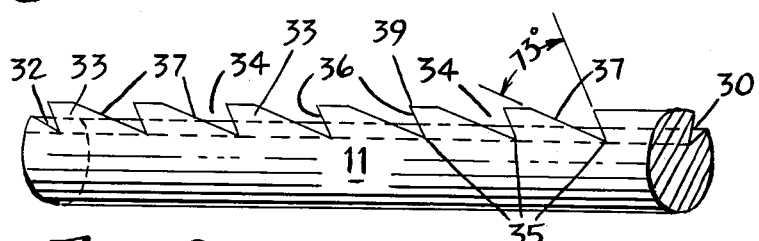
INVENTOR:
William L. Wood,
BY
Harrington A. Lockey
ATTORNEY.

United States Patent Office 2,986,862
Patented June 6, 1961

2,986,862
COTTON PICKING MACHINE
William L. Wood, Tupelo, Miss., assignor to Allis-Chalmers Manufacturing Company, Milwaukee, Wis.
Filed Mar. 31, 1958, Ser. No. 725,049
2 Claims. (Cl. 56—44)

This invention relates to a cotton picking machine and more particularly to an improved cotton handling device including rotary picking spindles and stationary stripper bars.

Cotton picking machines now in commercial use, such as those manufactured and sold by Allis-Chalmers, International Harvester and John Deere, employ cotton picking spindles which are adapted to be rotated in contact with the cotton fibers causing the fibers to adhere to the spindles, and are provided with stripping means of some type for subsequently stripping the cotton fibers from the spindles. A plurality of these spindles are carried by a single cotton picking unit, each unit comprising a rotary carrier for giving the spindles translatory as well as rotary motion for contacting and picking the cotton fibers from the cotton plants. Approximately one-half of the cycle of the rotary carrier is adapted for picking the cotton, and during the remaining cycle of the carrier, the spindles are stripped of their cotton and subsequently moistened in order to create better adherence between the spindle and the cotton fiber during the picking cycle. The cotton picking unit is adapted to be mounted upon a tractor or other type of prime mover for conveying the picking unit through a cotton field and also for providing power to the cotton picking unit.

In certain types of cotton picking machines a rotary carrier comprises upper and lower continuous chains adapted to rotate in parallel horizontal planes. Extending between the rotary chains are spaced vertical slats, each slat supporting a plurality of laterally extending cotton picking spindles. The spindles are adapted to be rotated during their picking cycle by means of rollers engaging rubber tracks fixed to the frame of the cotton picking unit.

Various types of spindles have been employed for use in the cotton picking units described above. For instance, U.S. Patent 2,671,298 issued on March 9, 1954 to R. C. Fergason discloses a wire type spindle comprising a relatively small diameter rod, the surface of which is fluted near its free end. This type of spindle must be moistened in order for the fluted surface of the spindle to adhere to the cotton fibers during the picking cycle. Even when the spindle is moistened, fibers will not cling to the wet spindle unless the cotton is mature and fluffy. If the cotton is "slicked down" by rain or heavy dew or is immature, the spindle will not adhere effectively to the cotton in this condition, resulting in a higher percentage of dropped cotton and a reduction in picking efficiency.

The type of spindle employed by International Harvester and John Deere, such as that illustrated in U.S. Patent No. 2,546,185, is much heavier than and has a diameter about three times as great as the wire type spindle and is gradually tapered toward the free end thereof. The tapered portion comprises a plurality of narrow teeth spaced from each other and generally disposed in a direction transverse to the axis of the spindle. This type spindle also has certain disadvantages because it too must also be moistened before it will adhere effectively to cotton fibers and before it can be self-cleaned by the doffer. The doffer has certain disadvantages because it does not contact the surface of the spindle in order to strip the cotton fibers, but unrolls or unwraps the fibers from the spindle, creating what is known in the art as "picker twist." In other words, the cotton fibers are twisted tightly together creating difficulty in the subsequent ginning of the cotton and adversely affects the spinning qualities of the cotton.

Generally, it is an object of this invention to provide an improved cotton picking machine wherein toothed rather than fluted wire type picking spindles are used to remove the cotton from the plants, and wherein removal of the cotton from the spindles is effected in a manner which will avoid undue wear of the spindles and undue dulling of the cotton engaging spindle teeth.

More specifically, it is an object of the invention to provide an improved cotton picking machine of the hereinabove outlined character incorporating stationary stripper bars, and wherein the spindles are passed through gaps between the bars in a manner which will avoid undue wear of the stripping bars as well as undue wear of the spindles and dulling of the cotton engaging teeth.

A further object of the invention is to provide an improved cotton picking machine of the hereinabove outlined character wherein coton engaging teeth are axially aligned on each spindle and wherein passage of the spindles through the stripping gaps is controlled in such a manner that the teeth and stripper bars will not come into contact with each other.

Further objects and advantages of this invention will be apparent from the following description taken in conjunction with the drawings, wherein:

FIG. 1 is a rear end elevation partly in section of a cotton picking unit employing the spindles made in accordance with this invention;

FIG. 2 is a section taken along the lines 2—2 of FIG. 1;

FIG. 3 is a section taken along the lines 3—3 of FIG. 2;

FIG. 4 is a longitudinal view of the spindle made in accordance with this invention;

FIG. 5 is an enlarged fragmentary view of the spindle disclosed in FIG. 4;

FIG. 6 is a view of the free end of the spindle;

FIG. 7 is a fragmentary view of the spindle taken along the lines 7—7 of FIG. 6;

FIG. 8 is a fragmentary view of the spindle taken along the lines 8—8 of FIG. 6;

FIG. 9 is a view taken along the lines 9—9 of FIG. 5.

Referring now to the drawings in more detail, FIG. 1 discloses a cotton picking unit 10 of the general type disclosed in the mentioned Ferguson patent, U.S. 2,671,298. The rear end of the picking unit 10 has been cut away in order to more clearly disclose the functional parts which cooperate with the picking spindles 11. A pair of continuous chains 12 and 13 are adapted to rotate simultaneously in upper and lower horizontal planes. The upper and lower chains 12 and 13 are driven by sprockets 14 and 15, respectively, mounted on a vertically disposed rotatable shaft 16, which in turn is driven by a sprocket 17 through a chain 18 from a motor, not shown, mounted on the frame of the tractor, not shown, to which the cotton picking unit 10 is attached.

A plurality of spaced slats 19 are vertically disposed and suspended at the ends thereof by the chains 12 and 13 in order to propel the slats in a continuous path. Each slat 19 is adapted to rotatably carry a plurality of spindles 11, the spindles extending laterally outward from the slats and spaced in a substantially vertical plane. The picking cycle of the unit 10 is effected by the spindles 11 extending from the slats 19 on the right hand side of the machine beyond the stalk guides 20, as disclosed in FIG. 1. During the picking cycle, the spindles 11 are rotating in order to engage and pick the cotton fibers from the plant. To rotate the spindles 11, the end of each spindle held by the slat 19 is provided with a serrated roller 21 which is adapted to engage a track 22 made of resilient rubber or plastic having a frictional surface adapted to cause the roller 21 to roll over the track 22 as the slats 19 are moved thereover by the chains 12 and 13. The tracks 22 are fixedly mounted with respect to the frame of the picking unit 10. The chains 12 and 13 and slats 19 traveling through the picking cycle are adapted to move toward the rear of the unit at approximately the same speed as the tractor or prime mover, not shown, is moving forward. Thus the relative movements of the tractor and the spindles 11 in the picking cycle substantially neutralize each other so that the spindles 11 are relatively stationary as they are rotating against the fibers on the cotton plants.

As the slats 19 are carried around the rear end of the unit 10, each roller 21 rolls off the end of the track 22 so that the spindles 11 are rotatably disengaged until they have traveled forward around the left side of the unit, as viewed in FIG. 1, and again engage the forward ends of the tracks 22. As the spindles 11 are carried forward along the left side of the unit 10, the non-rotating spindles 11 pass between the horizontal stripping bars 23. The stripping bars 23 are vertically spaced from each other a distance approximately equal to the diameter of the spindles in order that the stripping bars 23 may completely clean all of the cotton fibers from the spindles 11 by a wiping action. It will be noted from FIG. 2 that each spindle 11 is disposed at an obtuse angle to the forward direction of the chains 12 and 13. The stripping bars 23 are also mounted at an obtuse angle to the forward direction of the chain travel. Thus, when the spindle 11 approaches the stripping bars 23, the bars 23 will first engage the spindle near the slat 19. As the slat 19 continues to travel forward, the bars 23 will progressively slide along the spindle towards its free end, wiping the cotton fibers toward the free end where they will fall to the bottom of the stripper housing 24 and be conveyed by forced air means upward through the chute 25 to a basket or other receptacle, not shown, mounted above the tractor.

The mechanisms thus far described, except the spindles 11, are old in the art of picking cotton.

The spindle 11 is of the wire type comprising a rod preferably about 8 inches long and having a diameter of approximately ¼ inch. Extending the length of the surface of the spindle 11 is longitudinal groove 30 having a pair of intersecting planar walls 31 and 32 forming a dihedral angle of approximately 80 degrees, as disclosed in FIG. 6. The wall 32 is preferably 1 to 2 times the width of the wall 31 of the groove. The groove 30 is shown as extending the entire length of the spindle 11. The groove may be shorter so long as it is coterminous with the free end of the spindle and extends over that portion of the spindle in which teeth 33 are formed. During rotation of the spindle 11, the wall 32 acts as the leading edge of the groove 30, while the wall 31, in which the teeth 33 are formed, comprises the trailing edge of the groove 30.

Teeth 33 are formed in the wall 31 preferably by forming spaced notches or grooves 34 along parallel lines 35 (shown in FIG. 5 and as points in FIG. 9), each of said lines being at an angle to the axis of the spindle ranging between 25 to 55 degrees. Each notch 34 itself forms a dihedral angle of between 60 to 85 degrees. One side of the notch 34 forms the slightly undercut face 36 of the tooth 33, and the opposing side of the notch forms a gradually sloping back 37 for the adjacent tooth 33. The sloping portion of the back 37 is adapted to terminate at the surface of the spindle at a point 38 spaced behind the tooth point 39 a sufficient distance to strengthen the tooth, without affecting the optimum teeth spacing for aggressiveness and for the stripping action afforded by the sloping back 37. For a ¼ inch diameter spindle 11, the spacing between points 38 and 39 is preferably about ¼ the diameter, or 1/16 inch. The backs 37 slope at such an angle to permit any cotton fibers held on the non-rotating spindle 11 to be easily stripped from the spindle as it passes through the stripping bars 23 without tearing the fibers. The teeth 33 are so constructed that both the side portion formed by the groove wall 31 and the face 36 are slightly undercut in order to form an extremely sharp tooth point 39, and also to render the tooth point self-sharpening. If at any time the tooth point should become worn or slightly broken off, the remaining portion of the tooth point will be just as sharp as the original point. The teeth 33 are also designed so that there is no portion projecting beyond the cylindrical periphery of the spindle, nor is there any portion projecting into the longitudinal groove 30. Thus constructed, the teeth 33 will not pierce or adhere to any material which is not brought into the groove 30 or the notches 34 between the teeth 33. Thus, the formation of the teeth 33 and the groove 30 are most effectively constructed to adhere to delicate cotton fiber, whether it is dry, moist, mature, "fluffy," green, stringy, or compact. Conversely, the teeth 33 and groove 30 are so constructed that they will not adhere, even when the spindle is rotating rapidly, to the mass of foreign material of a cotton plant, such as the bolls, leaves, or any portion of the stalk.

The spindle 11 is also particularly adapted to be readily stripped of any adhering cotton fibers by the simple type of stripping mechanism disclosed in FIGS. 1 and 2, which comprises essentially a pair of spaced parallel bars 23 adapted to engage and wipe the cotton fibers from the surface, the notches 34 and the groove 30 of the spindle 11, as the non-rotating spindle travels forward between two of the bars 23.

In order to eliminate any wear between the barbed teeth 33 and the stripper bars 23 during the stripping operation, and indexing mechanism, as disclosed in FIGS. 2 and 3, is provided for rotating the spindle 11, if necessary, to a stationary position whereby the stripper bars will always engage only the solid smooth surface portions of the spindle. The indexing mechanism comprises a pair of diametrically opposed extrusions 40 formed on the roller 21, the extrusions 40 being in alignment with the barbed teeth 33. If the extrusions 40 and the teeth 33 are in vertical alignment after the roller 21 disengages the track 22 and completes the picking cycle, then the lower extrusion 40 engages a stationary kicker bar 41, preferably made of spring steel, which will rotate the roller 21 slightly, so that the alignment of the extrusions 40 and the teeth 33 will no longer be vertical and the stripper bars 23 will engage the smooth surface portions of the spindle 11 and not the teeth 33.

In general terms, a supporting structure for the spindles of the herein disclosed cotton picking machine comprises a frame and a carrier which is mounted on said frame in bodily movable relation thereto, such a frame being outlined in part by the dash-dotted lines in FIG. 1, and the carrier being represented by any one of the spindle slats 19. Power transmitting means, as represented by the chain 18 and associated parts, are mounted on the frame and operatively connected with the carrier for successively moving the latter through a picking path and a stripping path along said frame in conformity with conventional practice. A spindle, as represented by any one of the spindles 11 shown in FIG. 1, is rotatably mounted on the carrier and has an axially extending picking portion including a single axially extending row of picking teeth 33. A torque transmitting element, as represented by the roller 21, is secured to the spindle for rotation therewith relative to the carrier and has a pair of diametrically opposed radial projections 40 in predetermined circumferential relation to the row of picking teeth. Drive means which in the illustrated embodiment of the invention include the roller 21 and associated track 22, are cooperable with the spindle so as to rotate the latter on its axis during movement of the carrier through the picking path, and the drive means are automatically disconnectable upon passage of the carrier from the picking toward the stripping path. Stripper means comprise a pair of rigid stripping elements, as represented by any pair of the horizontal stripping bars 23 in FIG. 1, which are mounted on the frame in spaced relation to each other so as to present a stripping gap for the passage of the picking portion of the spindle therethrough. The kicker bar 41 shown in FIG. 3 represents a stationary abutment element which is mounted on the frame in cooperative relation to the torque transmitting element 21 for establishing a rotatively adjusted position of the spindle upon disconnection of the drive means, which will locate the picking teeth 33 during their passage through the stripping gap in noncontacting relation to the stripping elements.

Referring to FIGS. 3 and 6, it will be noted that in the illustrated embodiment of the invention the radial projection 40 which appears at the top of the roller 21 in FIG. 6 is disposed in circumferentially aligned relation with the row of picking teeth 33, and that the stationary abutment element 41 is disposed in transversely spaced relation to the stripping elements 23.

It will be apparent to those skilled in the art that various changes may be made in the invention, without departing from the spirit and scope thereof, and therefore the invention is not limited by that which is shown in the drawings and described in the specifications, but only as indicated in the appended claims.

What is claimed is:

1. In a cotton picking machine, the combination of a spindle supporting structure including a frame and a carrier mounted on said frame in bodily movable relation thereto; power transmitting means mounted on said frame and operatively connected with said carrier for successively moving the latter through a picking path and a stripping path along said frame; a spindle rotatably mounted on said carrier and having an axially extending picking portion including an axially extending row of picking teeth; a torque transmitting element secured to said spindle for rotation therewith relative to said carrier and having a pair of diametrically opposed radial projections in predetermined circumferential relation to said row of picking teeth; drive means mounted on said frame and cooperable with said spindle so as to rotate the latter on its axis during movement of said carrier through said picking path and automatically disconnectable upon passage of said carrier from said picking toward said stripping path; stripper means comprising a pair of rigid stripping elements mounted on said frame in spaced relation to each other so as to present a stripping gap for the passage of said picking portion of said spindle therethrough; and a stationary abutment element mounted on said frame in cooperative relation to said radial projections of said torque transmitting element for establishing a rotatively adjusted position of said spindle upon disconnection of said drive means, which will locate said picking teeth during their passage through said stripping gap in noncontacting relation to said stripping elements.

2. The combination set forth in claim 1, wherein one of said diametrically opposed radial projections of said torque transmitting element is disposed in circumferentially aligned relation to said row of picking teeth, and wherein said stationary abutment element is disposed in transversely spaced relation to said stripping elements.

References Cited in the file of this patent

UNITED STATES PATENTS

| Number | Name | Date |
|---|---|---|
| 762,606 | Appleby | June 14, 1904 |
| 2,058,513 | Rust et al. | Oct. 27, 1936 |
| 2,085,046 | Rust et al. | June 29, 1937 |
| 2,546,185 | Hagen | Mar. 27, 1951 |
| 2,577,367 | Rust | Dec. 4, 1951 |
| 2,665,535 | Rust | Jan. 12, 1954 |
| 2,692,469 | Smith | Oct. 26, 1954 |
| 2,700,864 | Fogle | Feb. 1, 1955 |
| 2,723,519 | Fergason | Nov. 15, 1955 |
| 2,833,103 | Davenport | May 6, 1958 |